United States Patent [19]
Reddy et al.

[11] Patent Number: 5,648,428
[45] Date of Patent: Jul. 15, 1997

[54] PROCESS FOR PREPARING AN ISOTACTIC/SYNDIOTACTIC POLYMER BLEND IN A SINGLE REACTOR

[75] Inventors: Baireddy Raghava Reddy, Baytown; Edwar Shoukri Shamshoum, Houston, both of Tex.

[73] Assignee: Fina Technology, Inc., Dallas, Tex.

[21] Appl. No.: 480,726

[22] Filed: Jun. 7, 1995

Related U.S. Application Data

[62] Division of Ser. No. 54,916, Apr. 28, 1993.

[51] Int. Cl.$^6$ ........................................................ C08F 4/64
[52] U.S. Cl. .................. 526/116; 526/114; 526/115; 526/118; 526/119; 526/128; 502/113; 502/125
[58] Field of Search ........................... 526/114, 115, 526/116, 118, 119, 128; 502/113, 125

[56] References Cited

U.S. PATENT DOCUMENTS

| | | | |
|---|---|---|---|
| 3,912,701 | 10/1975 | Dunn, Jr. | 260/93.7 |
| 4,259,208 | 3/1981 | Marie | 252/429 B |
| 4,659,685 | 4/1987 | Coleman, III et al. | 502/113 |
| 4,892,851 | 1/1990 | Ewen et al. | 502/104 |
| 5,145,818 | 9/1992 | Tsutsui et al. | 502/113 |
| 5,393,851 | 2/1995 | Ewen et al. | 526/153 |
| 5,395,810 | 3/1995 | Shamshoum et al. | 502/113 |

FOREIGN PATENT DOCUMENTS

| | | |
|---|---|---|
| 9513871 | 5/1995 | WIPO. |
| 9601855 | 1/1996 | WIPO. |

OTHER PUBLICATIONS

J. Am. Chem. Soc. 1988, 110, 6255–6256, Ewen et al "Syndrotactic propylene polymerization with Group 4 metallocene".
International Symposium on Recent Development in Olefin polymerization Catalyst, 1988. pp. 501–515. Keii et al. "catalystic olefin polymerization".

*Primary Examiner*—David W. Wu
*Attorney, Agent, or Firm*—Jim D. Wheelington; M. Norwood Cheairs

[57] ABSTRACT

The present invention is a process for producing a polymer blend in a single reactor, specifically a polymer blend of isotactic polyolefins and syndiotactic polyolefins. The catalyst system is a combination of at least one metallocene catalyst and at least one conventional supported Ziegler-Natta catalyst. The multi-catalyst system is obtained by mixing the components of at least one metallocene catalyst and at least one conventional supported Ziegler-Natta catalyst. The metallocene catalyst comprises a metallocene compound and an ionizing agent. The conventional supported Ziegler-Natta catalyst comprises an aluminum alkyl and a transition metal compound with, optionally, an electron donor.

11 Claims, 4 Drawing Sheets

PROCESS FOR PREPARING AN ISOTACTIC/ SYNDIOTACTIC POLYMER BLEND IN A SINGLE REACTOR

This is a Divisional application of co-pending application Ser. No. 08/054,916, filed on Apr. 28, 1993.

BACKGROUND OF THE INVENTION

1. Field of the Invention

This invention relates to a process for producing polymer blends from a single reactor, specifically a process for producing polymer blends of isotactic polyolefins and syndiotactic polyolefins using a catalyst system which is a combination of at least one metallocene catalyst and at least one conventional supported Ziegler-Natta catalyst.

2. Description of the Prior Art

It is known that two or more homogeneous catalysts, such as those based on metallocene compounds, may be combined to effect properties, such as molecular weight distribution. U.S. Pat. No. 4,530,914 discloses use of a catalyst system comprising two or more metallocenes in the polymerization of α-olefins, primarily ethylene, to obtain a broad molecular weight distribution. The metallocenes each have different propagation and termination rate constants. The metallocenes are mixed with an alumoxane to form the catalyst system.

It is also known that metallocenes may be affixed to a support to simulate a heterogeneous catalyst. In U.S. Pat. No. 4,808,561 discloses reacting a metallocene with an alumoxane and forming a reaction product in the presence of a support. The support is a porous material like talc, inorganic oxides such as Group IIA, IIIA IVA OR IVB metal oxides like silica, alumina, silica-alumina, magnesia, titania, zirconia and mixtures thereof, and resinous material such as polyolefins like finely divided polyethylene. The metallocenes and alumoxanes are deposited on the dehydrated support material.

In U.S. Pat. No. 4,701,432 a support is treated with at least one metallocene and at least one non-metallocene transition metal compound. To form a catalyst system a cocatalyst comprising an alumoxane and an organometallic compound of Group IA, IIA, IIB and IIIA is added to the supported metallocene/non-metallocene. The support is a porous solid such as talc or inorganic oxides or resinous materials, preferably an inorganic oxide, such as silica, alumina, silica-alumina, magnesia, titania or zirconia, in finely divided form. By depositing the soluble metallocene on the support material it is converted to a heterogeneous supported catalyst. The transition metal compound, such as $TiCl_4$, is contacted with the support material prior to, after, simultaneously with or separately from contacting the metallocene with the support.

An advantage of a homogeneous metallocene catalyst system is the very high activity of the catalyst and the narrow molecular weight distribution of the polymer produced with a metallocene catalyst system. The metallocene catalysts suffer from a disadvantage in that the ratio of alumoxane cocatalyst to metallocene is high, requiring extensive treatment of the polymer product to remove the aluminum. Another disadvantage of the homogenous catalyst system is that the polymer product has small particle size and low bulk density. Another disadvantage of the homogeneous catalyst system is that the reactor fouls during polymerization.

It would be advantageous to provide a process to produce a polymer blend of isotactic and syndiotactic polyolefins using a catalyst system of a combination of a homogeneous catalyst with a heterogeneous catalyst in a single reactor.

BRIEF DESCRIPTION OF THE DRAWINGS

A more complete appreciation of the invention and many of the attendant advantages thereof will be readily understood by reference to the following detailed description when considered in connection with the accompanying drawings.

SUMMARY OF THE INVENTION

Figure 1:
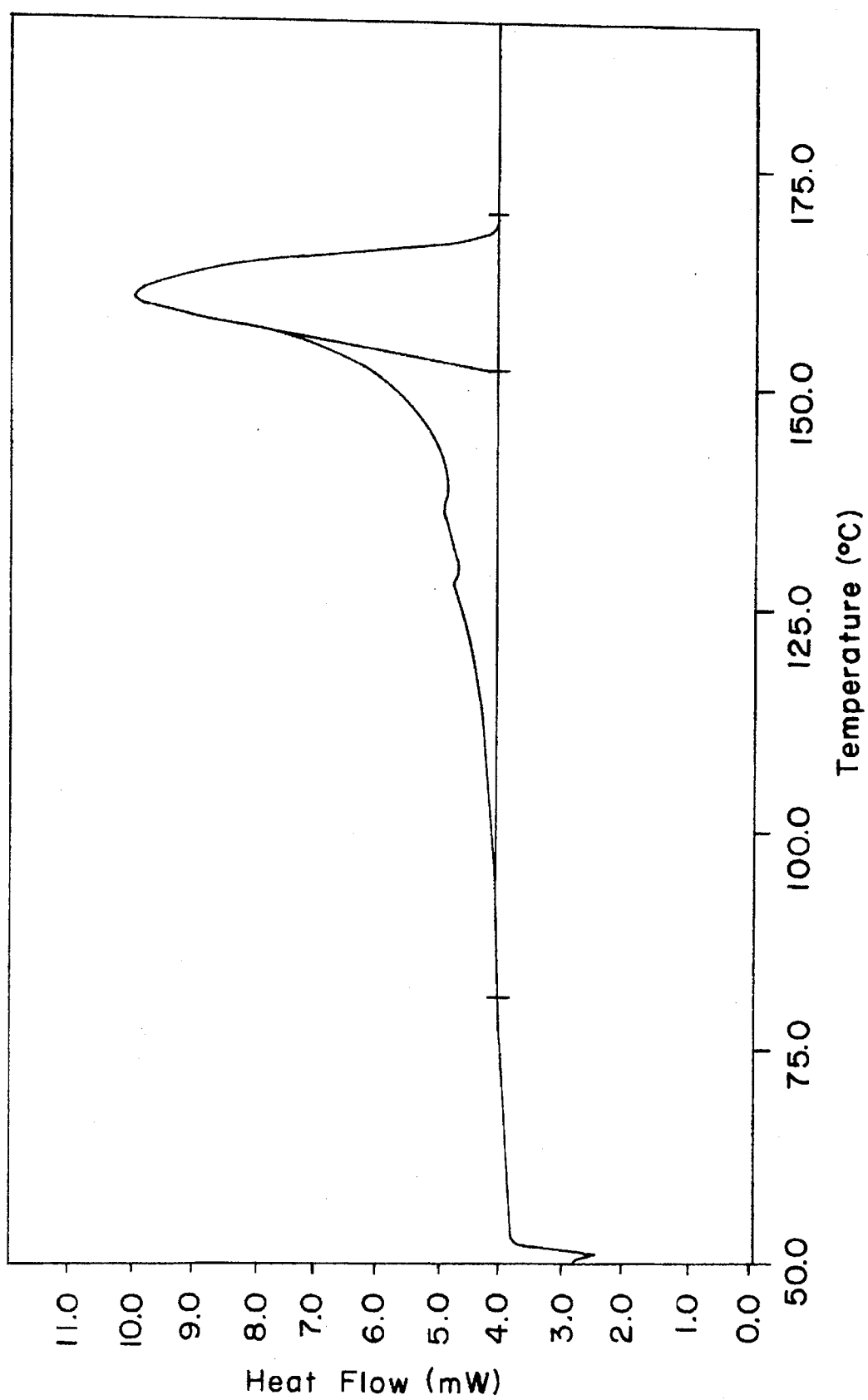
FIG. 1 is a graph of Differential Scanning Calorimetry results from Example 1.

Accordingly, this invention provides a process and a catalyst system to produce a polymer blend of isotactic polyolefins and syndiotactic polyolefins in a single reactor.

Also, this invention provides a process and a catalyst system which eliminates reactor fouling during polymerization.

These and other objects are accomplished by a process comprising:

a) making a catalyst system comprising at least one metallocene catalyst and at least one conventional supported Ziegler-Natta catalyst, (b) introducing said catalyst system into a polymerization reaction zone containing a monomer under polymerization conditions, and (c) withdrawing a polymer product.

DETAILED DESCRIPTION OF THE INVENTION

The present invention utilizes a multi-catalyst system in the polymerization of any polymer in which separate polymerizations with a homogeneous catalyst and with a heterogeneous catalyst are possible. Preferably, the multi-catalyst system is useful in the polymerization of olefins, more preferably, α-olefins, and, most preferably, propylene. This catalyst system is disclosed in U.S. Ser. No. 07/776,498 filed Oct. 11, 1991, now U.S. Pat. No. 5,254,517, hereby incorporated by reference.

The multi-catalyst system of the present invention is obtained by mixing the components of at least one metallocene catalyst and at least one conventional supported Ziegler-Natta catalyst. Generally, the components of a metallocene catalyst are a metallocene compound and an ionizing agent. Generally, the components of a conventional supported Ziegler-Natta catalyst are an aluminum alkyl and a transition metal compound with, optionally, an electron donor.

Any of the conventional heterogeneous Ziegler-Natta transition metal compound catalyst components for producing isotactic polyolefins can be used in the present invention. The compound is preferably of the general formula $MR_{x+}$ where M is the metal, $R_+$ is a halogen or a hydrocarboxyl and x is the valence of the metal. Preferably, M is a Group IVB, VB or VIB metal, more preferably a Group IVB, and most preferably titanium. Preferably, $R_+$ is chlorine, bromine, an alkoxy or a phenoxy, more preferably chlorine or ethoxy and most preferably, chlorine. Illustrative examples of the transition metal compound catalyst components are $TiCl_4$, $TiBr_4$, $Ti(OC_2H_5)_3Cl$, $Ti(OC_2H_5)Cl_3$, $Ti(OC_4H_9)_3Cl$, $Ti(OC_3H_7)_2Cl_2$, $Ti(OC_6H_{13})_2Cl_2$, $Ti(OC_2H_5)_2Br_2$ and $Ti(OC_{12}H_{25})Cl_3$. Mixtures of the transition metal compounds may be used. No restriction on the number of transition metal compounds is made as long as at least one transition metal compound is present.

The transition metal compound is supported on an inert solid which is chemically unreactive with any of the components of the heterogeneous or homogeneous catalyst. The support is preferably a magnesium compound. Examples of the magnesium compounds which are to be used to provide a support source for the catalyst component are magnesium halides, dialkoxymagnesiums, alkyoxymagnesium halides, magnesium oxyhalides, dialkylmagnesiums, magnesium oxide, magnesium hydroxide, and carboxylates of magnesium.

The aluminum alkyl is of the general formula $AlR\#_3$ where R# is an alkyl of from 1–8 carbon atoms and R# may be the same or different. Examples of aluminum alkyls are trimethyl aluminum (TMA), triethyl aluminum (TEAl) and triisobutyl aluminum (TiBAl). The preferred aluminum alkyl is TEAl.

The electron donor is any one of the electron donors which are effective with conventional supported Ziegler-Natta catalysts. Typically, an electron donor is an organosilicon compound. Examples of electron donors are cyclohexylmethyldimethyoxysilane (CMDS), diphenyldimethoxy silane (DPMS) and isobutyltrimethoxy silane (IBMS). Other examples of electron donors are disclosed in U.S. Pat. Nos. 4,218,339; 4,395,360; 4,328,122; 4,473,660; 4,562,173 and 4,547,552, which are hereby incorporated by reference.

The metallocene catalyst is formed from a neutral metallocene compound, i.e., a metal derivative of a cyclopentadiene. The metallocene compound useful in the present invention contains two cyclopentadiene rings and is of the general formula:

$$R''(C_5H_4)(C_4H_{4-m}R'_mC_5C_4H_{4-n}R'_n)MeQ_p$$

wherein $(C_5H_4)$ is a cyclopentadienyl ring and $(C_4H_{4-m}R'_mC_5C_4H_{4-n}R'_n)$ is a substituted cyclopentadienyl ring preferably, a fluorenyl ring or a substituted fluorenyl ring, the substituent preferably being alkyl, alkoxy, dialkylamino, halogens, cycloalkyl or aryl; R' is a hydrocarbyl radical, halogen, an alkoxy, an alkoxy alkyl or an alkylamino radical having from 1–20 carbon atoms, each R' may be the same or different; R" is a structural bridge between the $(C_5H_4)$ and $(C_4H_{4-m}R'_mC_5C_4H_{4-n}R'_n)$ rings to impart stereorigidity and, preferably, is an alkylene radical having 1–4 carbon atoms, or arylaklyl or diaryl alkyl radical contains 7–20 atoms, a silicon hydrocarbyl compound, a germanium hydrocarbyl compound, an alkyl phosphine, or an alkyl amine; Q is a hydrocarbon radical, such as an alkyl, aryl, alkenyl, alkylaryl or arylalkyl radical having 1–20 carbon atoms, or is a halogen; Me is a Group IIIB, IVB, VB, or VIB metal as positioned in the Periodic Table of Elements; $0 \leq m \leq 4$; $0 \leq n \leq 4$; and p is the valence of Me minus 2.

The cyclopentadienyl rings $(C_5H_4)$ and $(C_4H_{4-m}R'_mC_5C_4H_{4-n}R'_n)$ must have bilateral or pseudo-bilateral symmetry. Bilateral symmetry is defined as the condition in which there is no substituents or one or more substituents on one side and no substituents or one or more substituents on the other side in the same relative position such that a mirror image is formed from one side to another. Pseudobilateral symmetry is defined as symmetry such that a mirror image exists from one side to the other in regard to the existence and position of substituents but the substituents themselves are not identical.

The metallocene catalyst is syndiotactic specific or syndiospecific. Such catalyst are described in U.S. Pat. Nos. 4,892,851; 5,162,278; 5,155,080; 5,132,381 and European Patent Application Publication Nos. 0 387 609; 0 387 690; 0 387 691; and PCT International Publication No. WO 92/1218, all of which are hereby incorporated by reference.

The ionizing agent is an alumoxane, an aluminum alkyl, other Lewis acid or a combination thereof which will ionize a neutral metallocene compound to form a cationic metallocene catalyst. An examples of an ionizing agents useful in the present invention is methyl alumoxane (MAO).

The metallocene catalyst is provided in solid form as a complex of the metallocene catalyst component and MAO. This solid complex is produced by the method disclosed in copending patent application Ser. No. 08/055,267, hereby incorporated by reference.

Olefins, especially propylene, may be polymerized to form polyolefins in amorphous (atactic) or crystalline forms. Examples of crystalline forms are isotactic and syndiotactic.

Isotactic polypropylene contains principally repeating units with identical configurations and only a few erratic, brief inversions in the chain. Isotactic polypropylene may be structurally represented as

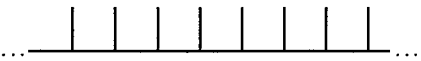

The methyl groups attached to the tertiary carbon atoms of successive monomeric units on the same side of a hypothetical plane through the main chain of the polymer, e.g., the methyl groups are all above or below the plane.

Another way of describing the structure is through the use of NMR. Bovey's NMR nomenclature for an isotactic pentad is . . . mmmm . . . with each "m" representing a "meso" dyad or successive methyl groups on the same side in the plane. As known in the art, any deviation or inversion in the structure of the chain lowers the degree of isotacticity and crystallinity of the polymer.

A syndiotactic polymer contains principally units of exactly alternating stereoisomers and is represented by the structure:

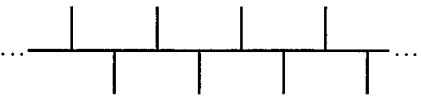

The methyl groups attached to the tertiary carbon atoms of successive monomeric units in the chain lie on alternate sides of the plane of the polymer.

In NMR nomenclature, this pentad is described as . . . rrrr . . . in which each "r" represents a "racemic" dyad, i.e., successive methyl groups on alternate side of the plane. The percentage of r dyads in the chain determines the degree of syndiotacticity of the polymer. Syndiotactic polymers are crystalline and like the isotactic polymers are insoluble in xylene. This crystallinity distinguishes both syndiotactic and isotactic polymers from atactic polymer that is soluble in xylene.

A polymer chain showing no regular order of repeating unit configurations is an atactic polymer. In commercial applications, a certain percentage of atactic polymer is typically produced with the isotactic form.

The invention having been generally described, the following examples are given as particular embodiments of the invention and to demonstrate the practice and advantages thereof. It is understood that the examples are given by way of illustration and are not intended to limit the specification or the claims to follow in any manner.

Solid Metallocene Catalyst Preparation

Methyl aluminoxane supplied as a 10% solution in toluene (density 0.89) was used as the cocatalyst. 40mg of isopropyl (fluorenyl-cyclopentadienyl)zirconium dichloride, was dissolved in 20.0 ml of MAO solution; the solution was stirred and the solvent was removed under high vacuum at room temperature and traces of the remaining solvent were removed with slight warming. The flask was taken into a vacuum Atmospheres dry box; the solid was removed and pulverized to obtain 1.3 g purple solid. A known amount of the solid was weighed out and suspended in 2–4 ml of mineral oil (Amoco-10NF), in a Wheaton bottle; shaken thoroughly and injected into a stainless steel sample transfer cylinder as described in the example. Generally, a small amount (estimated to be about 10%) of the solid remained adhered to the glass wall and could not be transferred. It is also likely that small amount of solid remains adhered to the walls of sample transfer cylinder during injection.

EXAMPLE 1

10.0 mg of conventional supported Ziegler-Natta catalyst were placed in a stainless steel bomb with 0.2 mmol of cyclohexylmethyldimethoxysilane (CMDS) and 2.0 mmol of triethylaluminum (TEAl). 184 mg of isopropyl(fluorenyl) (cyclopentadienyl)zirconium dichloride/MAO solid were suspended in 4 milliliters of mineral oil. The metallocene/MAO-mineral oil suspension was placed in the bomb. Hydrogen (approximately 16 mmol) was introduced followed by 1.0 liter of propylene into a 2 liter Zipperclave reactor kept at 60° C. Contents of the bomb were prepolymerized with 0.3 liter of propylene for 5 seconds at 23° C. and then charged into the reactor. The reactor temperature was maintained at 60° C. Polymerization continued for one hour during which time the reactor was maintained at the polymerization temperature. At the end of this time polymerization was terminated by rapidly venting the reactor of unreacted monomer. The polymer yield and analysis is shown in Table I.

EXAMPLE 2

The procedure of Example 1 was followed except that only the metallocene/MAO of solid (184.0 ml) and TEAl (2.0 mmol) were used in the bomb and hydrogen was omitted. The reactor temperature was initially 20° C. and was increased to 60° C. after the contents of the bomb were charged to the reactor with 0.3 liter of propylene. The polymer yield and analysis is shown in Table I.

EXAMPLE 3

The procedure of Example 1 was followed except that the conventional Ziegler-Natta catalyst was not added and the other contents were used in identical quantities.

TABLE I

| RUN | TEA1 (mmol) | CMOS (mmol) | HETEROGENEOUS CATALYST (mg) | METALLOCENE/MAO AMOUNT(mg) | METALLOCENE AMOUNT(mg) | $H_2$ (mmol) | POWDER YIELD (g) |
|---|---|---|---|---|---|---|---|
| 1 | 2.0 | 0.2 | 10.0 | 184 | 4 | 15.7 | 177 |
| 2 | 2.0 | 0.0 | 0.0 | 184 | 4 | 0.0 | 140 |
| 3 | 2.0 | 0.2 | 0.0 | 184 | 4 | 15.7 | 28 |

| RUN | SOLID FOULING (g) | TOLUENE EXTRACT (g) | TOTAL YIELD (g) | CATALYST EFFICIENCY (g/g · h) | PERCENT FOULING (%) | BULK DENSITY (g/cc) | $T_m$ (°C.) | MWD |
|---|---|---|---|---|---|---|---|---|
| 1 | 0 | 0 | 177 | n.d[a] | 0 | 0.40 | 159[b] | 13.3[c] |
| 2 | 0 | 0 | 140 | 35000 | 0 | 0.32 | 135 | 3.0[d] |
| 3 | 0 | 0 | 28 | 7000 | 0 | n.d | n.d | |

Figure 2:
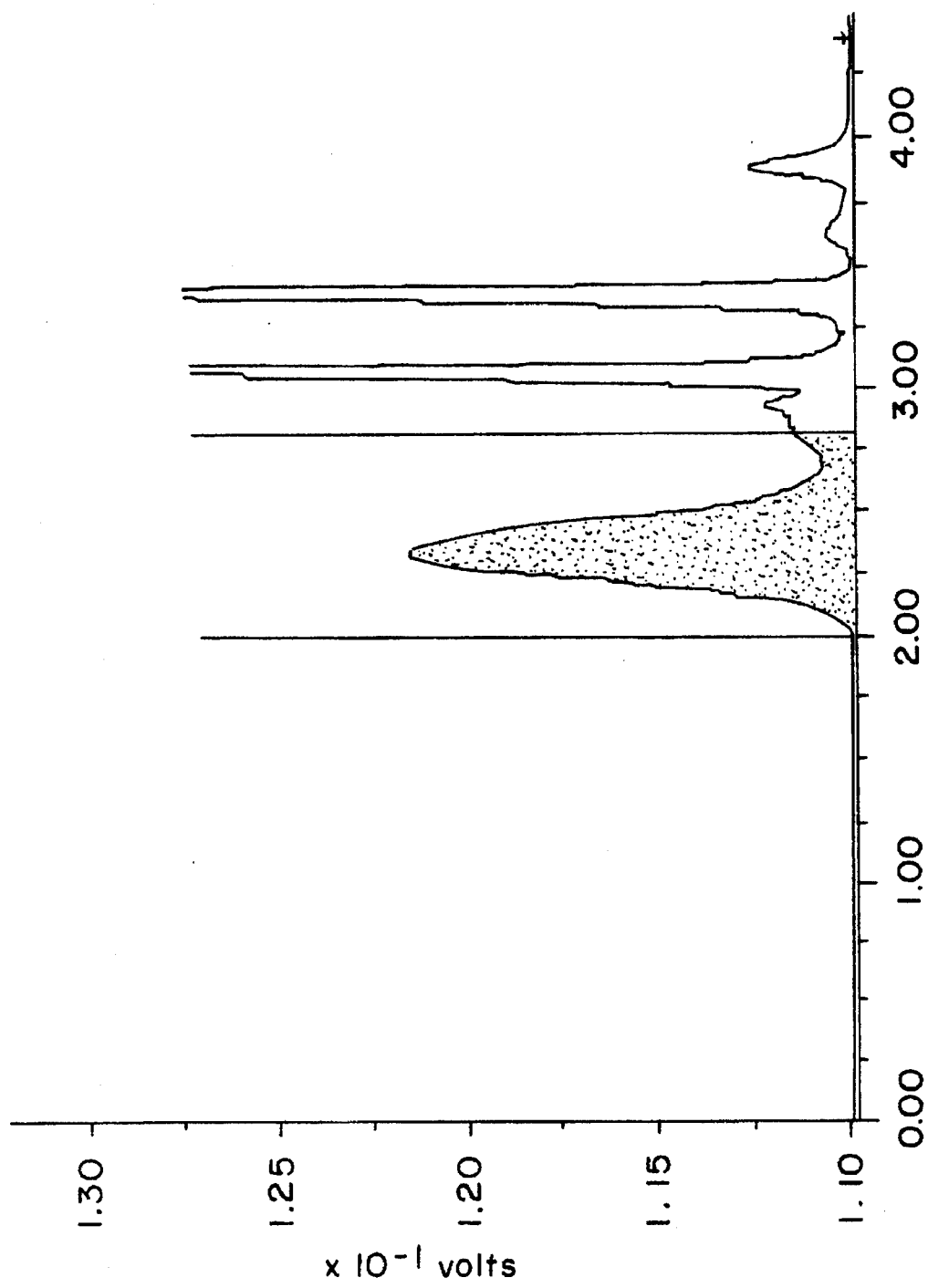
FIG. 2 is a graph of Gel Permeation Chromatography results from Example 2.
Figure 3:
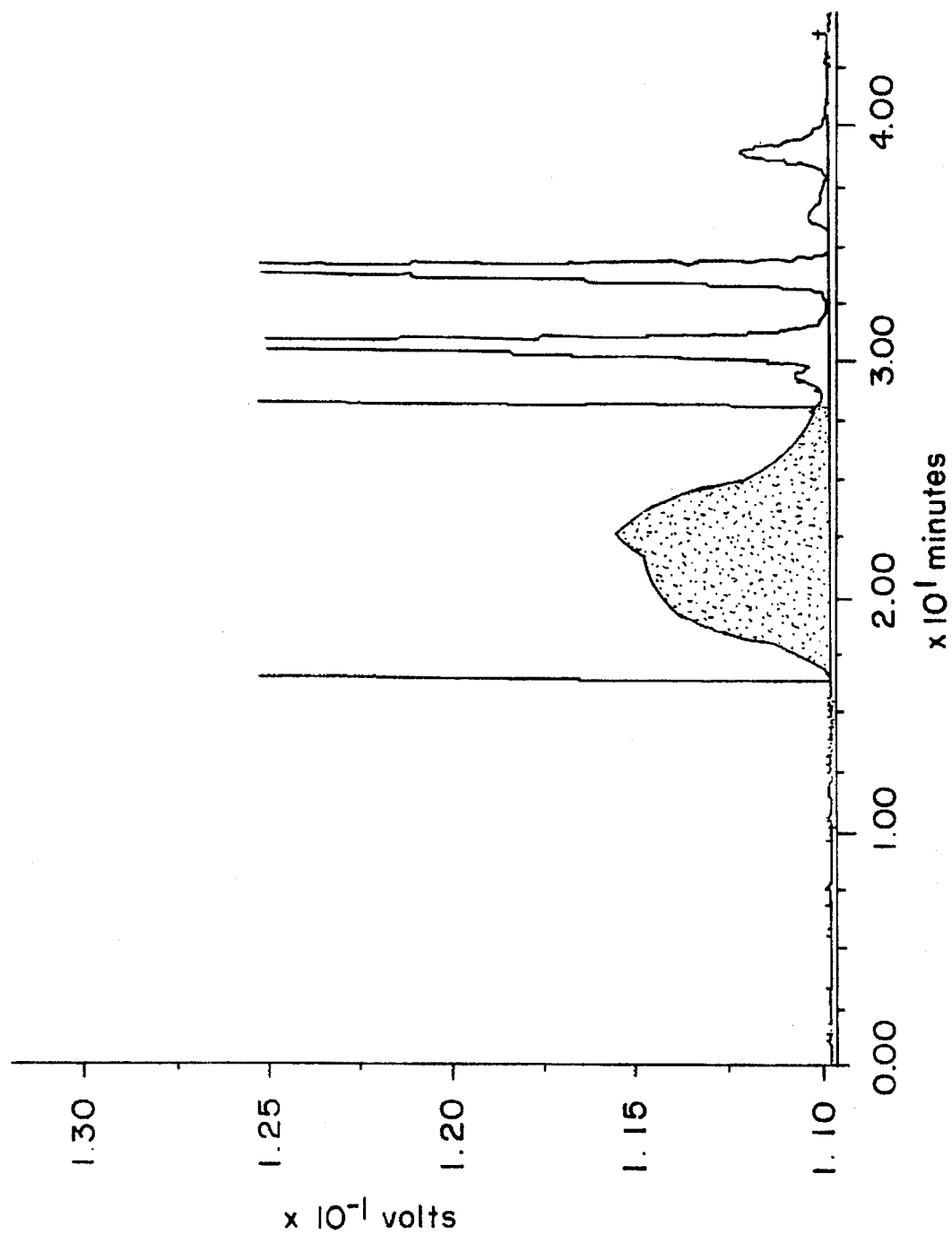
FIG. 3 is a graph of Gel Permeation Chromatography results from Example 1.
Figure 4:
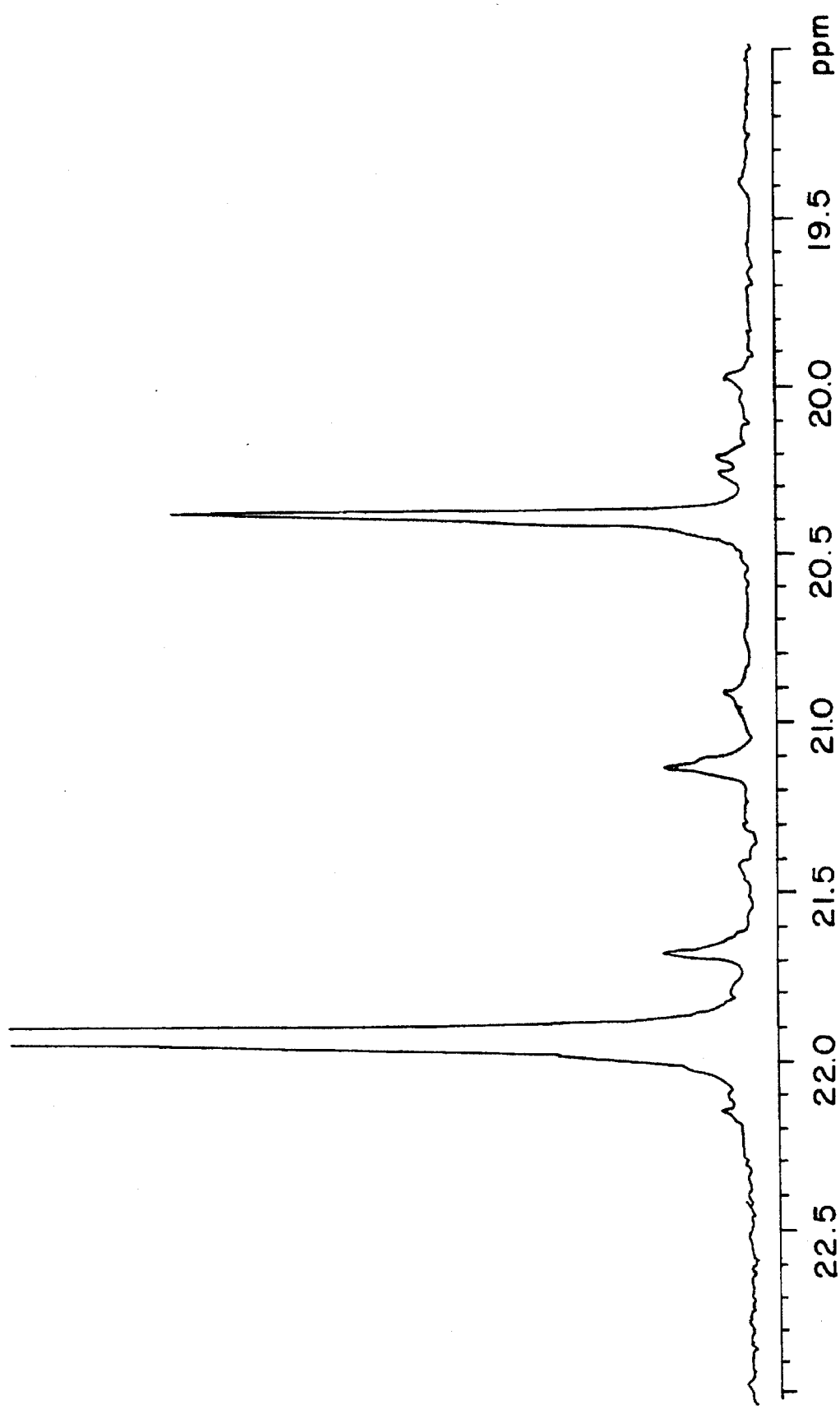
FIG. 4 is a graph of $^{13}C$ NMR results from Example 1.

[a] n.d = not determined
[b] Small DSC peaks at 126° C. and 135° C. can be seen due to the presence of syndiotactic polypropylene
[c] bimodal distribution; Mw = 441; Mn = 33.0; It is important to note that MWD of IPP obtained under similar conditions in the presence of conventional Ziegler-Natta catalyst system is approximately 8.0.
[d] Mw = 57.4 × $10^3$; $M_n$ = 18.9 × $10^3$ The standard polymer characterization techniques, namely DSC (Differential Scanning Calorimetry), GPC (Gel Permeation Chromatography) and carbon 13 nuclear magnetic resonance ($^{13}C$ NMR) spectroscopy, strongly suggest that the polymer obtained with the mixed catalyst is indeed a blend of syndiotactic and isotactic polypropylene. For example, DSC shows (FIG. 1) the presence of two small peaks at approximately 125° C. and 135° C. corresponding to the melting peaks of syndiotactic polymer obtained with the metallocene and MAO solid. It is also obvious from DSC that isotactic polypropylene is the major component of the blend. GPC teaches that the molecular weight distribution of the polymer is much broader than those obtained when the conventional Ziegler-Natta or metallocene and alumoxane systems separately under the same conditions. Thus for example, the polydispersity of isotactic polypropylene (iPP) obtained with the conventional Ziegler-Natta catalyst used in the present system is approximately 8.0, whereas that of the syndiotactic polypropylene (sPP) obtained with solid MAO and metallocene catalyst used is around 3.0 (FIG. 2). However, the polydispersity of the iPP/sPP blend obtained with the mixed catalyst system is 13 (FIG. 3). $^{13}C$ NMR (FIG. 4) of the polymer provides the most conclusive evidence for the presence of two types of stereoregular polypropylene in the product blend. The mmmm:rrr ratio for the polymer blend product was 77:13 which suggest presence of substantial amounts (>10%) of syndiotactic PP in the predominantly isotactic polymer sample. Generally the isotactic polypropylene polymer obtained with the conventional Ziegler-Natta catalyst contains only traces (<0.5%) of syndiotactic component.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letter of Patent of the United States is:

1. A process of producing a polymer blend in a single reactor comprising:
   a) making a syndiospecific metallocene catalyst consisting of:
      1) selecting a neutral metallocene compound of the general formula

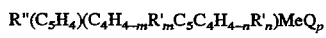

wherein $(C_5H_4)$ is a cyclopentadienyl ring and $(C_4H_{4-m}R'_mC_5C_4H_{4-n}R'_n)$ is a substituted cyclopentadienyl ring wherein $(C_5H_4)$ and $(C_4H_{4-m}R'_mC_5C_4H_{4-n}R'_n)$ have bilateral or pseudo-bilateral symmetry; R' is a hydrocarbyl radical having from 1–20 carbon atoms, a halogen, an alkoxy, an alkoxy alkyl or an alkylamino radical, each R' may be the same or different; R" is a structural bridge between the $(C_5H_4)$ and $(C_4H_{4-m}R'_mC_5C_4H_{4-n}R'_n)$ rings to impart stereorigidity; Q is a hydrocarbon radical or is a halogen; Me is a Group IIIB, IVB, VB, or VIB metal as positioned in the Periodic Table of Elements; $1 \leq m \leq 4$; $0 \leq n \leq 4$; and p is the valence of Me minus 2,
      2) adding an aluminoxane in solvent to form a syndiospecific metallocene catalyst,
      3) extracting solvent to form a solid complex consisting of the metallocene and the aluminoxane,
      4) suspending the solid in mineral oil,
   b) making a conventional supported Ziegler-Natta catalyst by
      1) selecting a transition metal compound of the general formula $MR^+_x$ where M is a Group IIIB, IVB, VB or VIB metal, $R^+$ is a halogen or a hydrocarboxyl and x is the valence of the metal and
      2) adding an aluminum alkyl of the general formula $AlR\#_3$ where R# is an alkyl of from 1–8 carbon atoms and R# may be the same or different to form a conventional supported Ziegler-Natta catalyst
   c) mixing the metallocene catalyst in mineral oil and the conventional supported Ziegler-Natta catalyst,
   d) introducing the mixture of the metallocene catalyst in mineral oil and the conventional supported Ziegler-Natta catalyst into a polymerization reaction zone containing a monomer under polymerization conditions, and
   e) withdrawing a polymer product.

2. A process as recited in claim 1 wherein R" is a hydrocarbyl radical chosen from the group consisting of an alkenyl radical having one to four carbon atoms, a dialkyl germanium, a dialkyl silicon, an alkyl phosphine and an amine radical, M is a Group IVB metal, R' is a halogen or alkyl.

3. A process as recited in claim 1 wherein R" is an isopropenyl radical.

4. A process as recited in claim 1 wherein the aluminoxane is methyl alumoxane.

5. A process as recited in claim 1 wherein M is a Group IVB, $R^+$ is chlorine, bromine, an alkoxy or a phenoxy.

6. A process as recited in claim 1 wherein M is titanium and $R^+$ is chlorine or ethoxy.

7. A process as recited in claim 1 wherein the transition metal compound is chosen from the group consisting of $TiCl_4$, $TiBr_4$, $Ti(OC_2H_5)_3Cl$, $Ti(OC_2H_5)Cl_3$, $Ti(OC_4H_9)_3Cl$, $Ti(OC_3H_7)_2Cl_2$, $Ti(OC_6H_{13})_2Cl_2$, $Ti(OC_2H_5)_2Br_2$ and $Ti(OC_{12}H_{25})Cl_3$.

8. A process as recited in claim 1 wherein the aluminum alkyl is chosen from the group consisting of trimethyl aluminum, triethyl aluminum and triisobutyl aluminum.

9. A process as recited in claim 1 further comprising an electron donor organosilicon compound.

10. A process as recited in claim 9 wherein the electron donor is chosen from the group consisting of cyclohexylmethyl dimethyoxysilane, diphenyldimethoxysilane and isobutyltrimethoxy silane.

11. A process of producing a polymer blend in a single reactor consisting of:
   a) making a syndiospecific metallocene catalyst by:
      1) selecting a neutral metallocene compound of the general formula

wherein $(C_5H_4)$ is a cyclopentadienyl ring and $(C_4H_{4-m}R'_mC_5C_4H_{4-n}R'_n)$ is a substituted cyclopentadienyl ring wherein $(C_5H_4)$ and $(C_4H_{4-m}R'_mC_5C_4H_{4-n}R'_n)$ have bilateral or pseudo-bilateral symmetry; R' is a hydrocarbyl radical having from 1–20 carbon atoms, a halogen, an alkoxy, an alkoxy alkyl or an alkylamino radical, each R' may be the same or different; R" is a structural bridge between the $(C_5H_4)$ and $(C_4H_{4-m}R'_mC_5C_4H_{4-n}R'_n)$ rings to impart stereorigidity; Q is a hydrocarbon radical or is a halogen; Me is a Group IIIB, IVB, VB, or VIB metal as positioned in the Periodic Table of Elements; $1 \leq m \leq 4$; $0 \leq n \leq 4$; and p is the valence of Me minus 2,
      2) adding an aluminoxane in solvent to form a syndiospecific metallocene catalyst,
      3) extracting solvent to form a solid complex consisting of the metallocene and the aluminoxane, and
      4) suspending the solid in mineral oil;
   b) making a conventional supported Ziegler-Natta catalyst by:
      1) selecting a transition metal compound of the general formula $MR^+_x$ where M is a Group IIIB, IVB, VB or VIB metal, $R^+$ is a halogen or a hydrocarboxyl and x is the valence of the metal and
      2) adding an aluminum alkyl of the general formula $AlR\#_3$ where R# is an alkyl of from 1–8 carbon atoms and R# may be the same or different to form a conventional supported Ziegler-Natta catalyst
   c) mixing the metallocene catalyst in mineral oil and the conventional supported Ziegler-Natta catalyst,
   d) introducing the mixture of the metallocene catalyst in mineral oil and the conventional supported Ziegler-Natta catalyst into a polymerization reaction zone containing a monomer under polymerization conditions, and
   e) withdrawing a polymer product.

* * * * *